United States Patent
Yin et al.

(10) Patent No.: US 9,862,831 B2
(45) Date of Patent: Jan. 9, 2018

(54) ASSEMBLY OF MAGNETICALLY TUNABLE PHOTONIC CRYSTALS IN NONPOLAR SOLVENTS

(75) Inventors: Yadong Yin, Riverside, CA (US); Jianping Ge, Shanghai (CN)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 1200 days.

(21) Appl. No.: 13/202,867

(22) PCT Filed: Feb. 23, 2010

(86) PCT No.: PCT/US2010/000528
§ 371 (c)(1),
(2), (4) Date: Nov. 4, 2011

(87) PCT Pub. No.: WO2010/096203
PCT Pub. Date: Aug. 26, 2010

(65) Prior Publication Data
US 2012/0061609 A1 Mar. 15, 2012

Related U.S. Application Data

(60) Provisional application No. 61/154,717, filed on Feb. 23, 2009, provisional application No. 61/154,659, filed on Feb. 23, 2009.

(51) Int. Cl.
*H01F 1/00* (2006.01)
*C09C 1/24* (2006.01)
*C01G 49/08* (2006.01)

(52) U.S. Cl.
CPC ............ *C09C 1/24* (2013.01); *C01G 49/08* (2013.01); *C01P 2006/42* (2013.01)

(58) Field of Classification Search
CPC ...... H01F 1/344; H01F 1/0045; H01F 1/0063; H01F 1/0072; H01F 1/009; C01P 2004/64;
(Continued)

(56) References Cited

U.S. PATENT DOCUMENTS

| 5,049,307 A | * | 9/1991 | Tabony | C09K 19/02 252/299.01 |
| 6,982,501 B1 | * | 1/2006 | Kotha | B82Y 25/00 310/10 |

(Continued)

FOREIGN PATENT DOCUMENTS

| JP | 03-095298 A | 4/1991 |
| JP | 03-163805 A | 7/1991 |

(Continued)

OTHER PUBLICATIONS

Sainis et al., "Electrostatic Interactions of Colloidal Particles in Nonpolar Solvents: Role of Surface Chemistry Control Agents", Langmuir, published on WEB Dec. 7, 2007, vol. 24, Issue 4, pp. 1160-1164.*

(Continued)

*Primary Examiner* — Matthew E Hoban
*Assistant Examiner* — Lynne Edmondson
(74) *Attorney, Agent, or Firm* — Buchanan Ingersoll & Rooney PC (57) ABSTRACT

A method of assembling superparamagnetic colloids into ordered structures with magnetically tunable photonic properties in nonpolar solvents by establishing long-range electrostatic repulsive forces using charge control agents. Reverse micelles resulted from the introduction of charge control agents such as AOT molecules can enhance the charge separation on the surfaces of n-octadecyltrimethoxysilane modified $Fe_3O_4@SiO_2$ particles. The significantly
(Continued)

improved long-range electrostatic repulsion can counterbalance the magnetically induced attraction and therefore allow ordering of superparamagnetic colloids in nonpolar solvents. This system possesses fast and fully reversible optical response to the external magnetic fields, long-term stability in performance, and good diffraction intensity.

19 Claims, 6 Drawing Sheets

(58) Field of Classification Search
CPC .. C01P 2006/42; C01P 2004/84; B82Y 30/00;
B82Y 25/00; B82Y 15/00; B82Y 5/00;
B82Y 20/00; B82Y 40/00; B82Y 10/00;
C01G 49/08; C01G 1/02; C01G 1/12;
C01G 1/00; C01G 23/053; C01G 25/02;
C01G 49/02; C01B 17/20; C01B 19/007;
C01B 21/06; A61K 49/0019; A61K
49/0021; A61K 49/0419; A61K 49/0461;
A61K 51/1244; C09C 1/24
USPC ........... 252/62.56, 62.59, 62.51 R, 583, 587;
428/402, 403, 690, 458; 977/773, 774,
977/838, 895, 746; 424/489, 490, 9.3,
424/9.4, 9.6, 9.7; 264/624
See application file for complete search history.

(56) References Cited

U.S. PATENT DOCUMENTS

| 2005/0109976 | A1* | 5/2005 | Fuchs et al. | 252/62.54 |
| 2005/0116194 | A1* | 6/2005 | Fuchs et al. | 252/62.54 |
| 2007/0042507 | A1* | 2/2007 | Tsang | G01N 13/00 436/524 |
| 2007/0105163 | A1* | 5/2007 | Grate | B03C 1/00 435/7.5 |
| 2008/0057130 | A1* | 3/2008 | Brotzman, Jr. | 424/490 |
| 2008/0064788 | A1 | 3/2008 | Ben-Moshe et al. | |
| 2008/0247932 | A1 | 10/2008 | Li et al. | |
| 2010/0224823 | A1 | 9/2010 | Yin et al. | |

FOREIGN PATENT DOCUMENTS

| JP | 04-188705 | A | 7/1992 |
| JP | 2001-147407 | A | 5/2001 |
| JP | 2004-149738 | A | 5/2004 |
| JP | 2007-147827 | A | 6/2007 |
| JP | 2007-217258 | A | 8/2007 |
| WO | 2007/145242 | A | 12/2007 |
| WO | WO 2009/017525 | A2 | 2/2009 |

OTHER PUBLICATIONS

Philipse et al, "Magnetic Silica Dispersions: Preparation and Stability of Surface Modified Silica Particles with a Magnetic Core", 1994, Langmuir, 10, pp. 92-99.*
Caruso et al., "Sol-Gel Nanocoating: An approach to the Preparation of Structured Materials", published on web Jul. 6, 2001, Chem. Mater., 13, pp. 3272-3282.*
Dresco et al., "Preparation and Properties of Magnetite and Polymer Magnetite Particles". Feb. 17, 1999, Langmuir 1999, 15, pp. 1945-1951.*
International Search Report (PCT/ISA/210) dated Sep. 30, 2010, by Korean Patent Office as the International Searching Authority for International Application No. PCT/US2010/000528.
Written Opinion (PCT/ISA/237) dated Sep. 30, 2010, by Korean Patent Office as the International Searching Authority for International Application No. PCT/US2010/000528.
S.K. Sainis et al., "Electrostatic Interactions of Colloidal Particles in Nonpolar Solvents: Role of Surface Chemistry and Charge Control Agents", Langmuir, 2008, pp. 1160-1164, vol. 24, Issue 4.

J. Ge et al., "Assembly of Magnetically Tunable Photonic Crystals in Nonpolar Solvents", J. Am. Chem. Soc., 2009, pp. 3484-3486, vol. 131, Issue 10.
Extended European Search Report dated Jun. 12, 2013, issued by the European Patent Office in the corresponding European Application No. 10744084.4. (8 pages).
Ge et al., "Magnetically Tunable Colloidal Photonic Structures in Alkanol Solutions", Advanced Materials, Sep. 17, 2008, vol. 20, Issue 18, pp. 3485-3491.
Official Action dated Jan. 7, 2015 by the Japanese Patent Office in corresponding Japanese Patent Application No. 2011-551074, and an English translation thereof.
Fudouzi et al., "Colloidal Crystals with Tunable Colors and Their Use as Photonic Papers", Langmuir, 2003, vol. 19, No. 23, pp. 9653-9660.
Asher et al., "Photonic Crystal Aqueous Metal Cation Sensing Materials", Analytical Chemistry, Apr. 1, 2003,vol. 75, No. 7, pp. 1676-1683.
Lawrence et al., "Dynamic Tuning of Organic Lasers with Colloidal Crystals", Advanced Materials, 2006, vol. 18, pp. 300-303.
Tian et al., "Colorful humidity sensitive photonic crystal hydrogel", Journal of Materials Chemistry, 2008, vol. 18, pp. 1116-1122.
Arsenault et al., "Photonic-crystal full-colour displays", Nature Photonics, Aug. 2007, vol. 1, pp. 468-472.
Gu et al., "Photochemically Tunable Colloidal Crystals", J. Am. Chem. Soc., 2000, vol. 122, No. 49, pp. 12387-12388.
Sumioka et al., "Tuning the Optical Properties of Inverse Opal Photonic Crystals by Deformation", Advanced Materials, Sep. 16, 2002, vol. 14, No. 18, pp. 1284-1286.
Jeong et al., "Photonic Crystals with Thermally Switchable Stop Bands Fabricated from Se@Ag2Se Spherical Colloids", Angew. Chem. Int. Ed., 2005, vol. 44, pp. 3099-3103.
Kuai et al., "Tunable electrochromic photonic crystals", Applied Physics Letters, 2005, vol. 86, No. 221110, (3 pages).
Lumsdon et al., "Dielectrophoretic assembly of oriented and switchable two-dimensional photonic crystals", Applied Physics Letters, Feb. 10, 2003, vol. 82, No. 6, pp. 949-951.
Mach et al., "Switchable Bragg diffraction from liquid crystal in colloid-templated structures", Europhysics Letters, Jun. 1, 2002, vol. 58, No. 5, pp. 679-685.
Ge et al., "Highly Tunable Superparamagnetic Colloidal Photonic Crystals", Angew. Chem. Int. Ed., 2007, vol. 46, pp. 7428-7431.
Ge et al., "Self-Assembly and Field-Responsive Optical Diffractions of Superparamagnetic Colloids", Langmuir, 2008, vol. 24, No. 7, pp. 3671-3680.
Ge et al., "Magnetically responsive colloidal photonic crystals", Journal of Materials Chemistry, 2008, vol. 18, pp. 5041-5045.
Bibette, "Monodisperse ferrofluid emulsions", Journal of Magnetism and Magnetic Materials, 1993, vol. 122, pp. 37-41.
Garcia et al., "Use of p-Toluenesulfonic Acid for the Controlled Grafting of Alkoxysilanes onto Silanol Containing Surfaces: Preparation of Tunable Hydrophilic, Hydrophobic, and Super-Hydrophobic Silica", J. Am. Chem. Soc., 2007, vol. 129, No. 16, pp. 5052-5060.
Wang et al., "Fabrication of Two- and Three-Dimensional Silica Nanocolloidal Particle Arrays", J. Phys. Chem. B, 2003, vol. 107, No. 15, pp. 3400-3404.
Ge et al., "Superparamagnetic Magnetite Colloidal Nanocrystal Clusters", Angew. Chem. Int. Ed., 2007, vol. 46, pp. 4342-4345.
Ge et al., "Superparamagnetic Composite Colloids with Anisotropic Structures", J. Am. Chem. Soc., 2007, vol. 129, No. 29, pp. 8974-8975.
Roberts et al., "Electrostatic Charging of Nonpolar Colloids by Reverse Micelles", Langmuir, 2008, vol. 24, No. 13, pp. 6530-6541.
Chen, "Electronic paper: Flexible active-matrix electronic ink display", Nature, May 8, 2003, vol. 423, (4 pages).
Comiskey et al., "An electrophoretic ink for all-printed reflective electronic displays", Nature, Jul. 16, 1998, vol. 394, pp. 253-255.
Hsu et al., "Charge Stabilization in Nonpolar Solvents", Langmuir, 2005, vol. 21, No. 11, pp. 4881-4887.
Briscoe et al., "Direct Measurement of Surface Forces Due to Charging of Solids Immersed in a Nonpolar Liquid", Langmuir, 2002, vol. 18, No. 10, pp. 3945-3956.

(56) References Cited

OTHER PUBLICATIONS

Office Action dated Apr. 1, 2016 by the Canadian Intellectual Property Office in corresponding Canadian Patent Application No. 2,753,359 (6 pages).
Communication Pursuant to Article 94(3) EPC dated Nov. 14, 2016 by the European Patent Office in corresponding European Patent Application No. 10 744 084.4 (5 pages).
Communication Pursuant to Article 94(3) EPC dated Jul. 20, 2017 in corresponding European Patent Application No. 10 744 084.4 (4 pages).

* cited by examiner

ASSEMBLY OF MAGNETICALLY TUNABLE PHOTONIC CRYSTALS IN NONPOLAR SOLVENTS

CROSS-REFERENCE TO RELATED APPLICATION

This application claims priority to U.S. Provisional Patent Application No. 61/154,659, filed Feb. 23, 2009, and U.S. Provisional Patent Application No. 61/154,717, filed Feb. 23, 2009, which are incorporated herein by this reference in their entirety.

FIELD OF THE INVENTION

This invention relates to a method and system for establishing long-range electrostatic repulsive forces in nonpolar solvents, and which allows the assembly of superparamagnetic colloids into ordered structures with magnetically tunable photonic properties.

BACKGROUND

It can be appreciated that researchers have previously synthesized magnetite nanoparticles which can form ordered structures. For example, the dynamic tuning of structural color with a single material has been demonstrated by exerting an external magnetic field on a solution of superparamagnetic colloidal nanocrystal clusters (CNCs), see for example, Ge, J., Hu, Y. & Yin, Y., Highly tunable superparamagnetic colloidal photonic crystals, *Angew. Chem. Int. Ed.* 46, 7428-7431 (2007). These ordered structures diffract light such that various colors are produced, and wherein the wavelength of color depends on the spacing of the nanocrystals in the ordered structure. The spacing is tunable by altering properties of the nanoparticle, for example, the photonic band gap of CNC's can be altered to cover the whole visible spectrum with fast response time, as described in Ge, J. & Yin, Y., Magnetically tunable colloidal photonic structures in alkanol solutions, *Adv. Mater.* 20, 3485-3491 (2008). However, a cost-effective and scalable implementation of this feature in manufacturing would greatly simplify production of multicoloured goods such as electronics, displays, and vehicles.

In addition, previous work with nanocrystals has traditionally been limited to the use of polar solvents. Accordingly, it would also be greatly advantageous to be able to work with these materials in nonpolar solvents, which are compatible with manufacturing and processing techniques.

The present invention herein describes compositions comprising modified nanoparticles capable of being used in nonpolar solvents, modified nanoparticles in combination with solvent constituents, and methods of making and using these compositions.

SUMMARY

In accordance with an exemplary embodiment, a method of forming ordered structures, which diffract light to create color comprises: coating a plurality of nanoparticles with a hydrophobic coating such that the nanoparticles are soluble in a nonpolar solvent solution; and adding a charge control agent to the nonpolar solvent solution, wherein the charge control agent enhances charge separation between the nanoparticles to form an ordered structure with tunable particle separation.

In accordance with another exemplary embodiment, a method of forming ordered structures, which diffract light to create color comprises: coating a plurality of magnetite crystals with a hydrophobic coating such that the crystals are soluble in a nonpolar solvent solution; and adding a surfactant to the nonpolar solvent solution, wherein the surfactant enhances charge separation between the crystals to form an ordered structure with tunable particle separation.

The details of one or more embodiments of the disclosure are set forth in the accompanying drawings and the description below. Other features, objects, and advantages will be apparent from the description and drawings, and from the claims.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

The present invention is directed to the use of nanoparticles capable of forming ordered structures, which diffract light to create color, hereafter referred to as "nanoparticles."

In accordance with an exemplary embodiment, the invention consists of coating a magnetite crystal in a hydrophobic coating such that it is soluble in a nonpolar solvent, and adding surfactants to the solution which affect the charges so that the particles have adequate repulsive forces to form ordered structures.

It can be appreciated that hydrophobic coating can be achieved by direct coating of the nanoparticle with hydrophobic substances. For example, in accordance with an exemplary embodiment, surfactants can be directly linked to nanoparticles to achieve solubility in nonpolar solvents. In accordance with an alternative embodiment, fatty alcohols can be linked to polyacrylic acid through the esterification reactions to directly make the particles hydrophobic. In accordance with another exemplary embodiment, the original capping ligands and link organosilanes can be removed directly to the nanoparticle surface.

The nanoparticles can also be made soluble in hydrophobic solvents through a multilayer approach. For example, an intermediate layer can be bound to the surface of the nanoparticles and then hydrophobic materials can be attached to the intermediate layer. In accordance with an exemplary embodiment, the intermediate layer is any material which is capable of binding to both the magnetite crystal and hydrophobic materials. For example, the intermediate layer can include both inorganic oxides and polymers. In accordance with an exemplary embodiment, the requirements can be that they can form a coating on the magnetite particle surface and are stable in the nonpolar solvents. It can be appreciated that many reactions can be used to bind inorganic oxides to the magnetite particles, such as hydrolysis and precipitation reactions. In addition, there are also several ways to coat the magnetite particles with polymer shells, such as emulsion polymerization, dispersion polymerization, and living polymerization.

In addition, many chemicals including but not limited to organosilanes can be used modify the particle surface with hydrophobic molecules. In accordance with an exemplary embodiment, the requirement for such compounds is that they should contain at least one reactive group that can react with the particle surface to link the molecule to the particle surface through covalent bonds, and at the same time they should contain a hydrophobic group that eventually makes the particle soluble in nonpolar solvents.

Organosilanes are a group of compounds that can be used to conveniently modify the surface property of inorganic oxides. Depending on the reactive groups on the organosilanes, various reactions can be used to link organosilanes to the particle surface. In the example below, ODTMS contains hydrolysable alkoxy groups which can attack the surface silanols through an alcoholysis reaction. Other choices of organosilanes includes but not limited to isobutyl(trimethoxy)silane, hexyltrichlorosilane, isobutyltrichlorosilane, octadecyltrichlorosilane, octyltriethoxysilane, triethoxy[4-(trifluoromethyl)phenyl] silane, octyltrimethoxysilane.

Fatty alcohols can also be linked to the silica surface through the esterification reaction of surface silanol groups with alcohol, leading to the formation of a monolayer coating of hydrophobic alkyl chains. Typical fatty alcohols include but not limited to 1-octadecanol, 1-dodecanol, 1-hexadecanol, 1-tetradecanol, 1-decanol, isostearyl alcohol.

For polymer coating, there are also many ways for surface modification, including but not limited to grafting polymerization and esterification reactions.

The invention further includes the use of surfactants to help effectuate the proper spacing of nanoparticles for the formation of ordered structures. These surfactants can be any amphiphilic organic compounds that contain both hydrophobic groups (their "tails") and hydrophilic groups (their "heads") and can form reverse micelles in nonpolar solvents. They can be anionic compounds containing sulfate, sulfonate or carboxylate anions such as perfluorooctanoate, perfluorooctanesulfonate, sodium dodecyl sulfate, ammonium lauryl sulfate, and other alkyl sulfate salts, sodium laureth sulfate, alkyl benzene sulfonate, fatty acid salts. They can also be cationic compounds with quaternary ammonium cations, such as cetyl trimethylammonium bromide, hexadecyl trimethyl ammonium bromide, and other alkyltrimethylammonium salts, cetylpyridinium chloride, polyethoxylated tallow amine, benzalkonium chloride, benzethonium chloride. Zwitterionic surfactants such as dodecyl betaine, cocamidopropyl betaine, and coco ampho glycinate can also be used for this purpose. The surfactants can also include nonionic compounds such as alkyl poly(ethylene oxide) alkylphenol, poly(ethylene oxide), copolymers of poly(ethylene oxide) and poly(propylene oxide), alkyl polyglucosides, fatty alcohols, and polysorbates.

Example

Field-responsive photonic structures have important applications in areas including but not limited to color display units, biological and chemical sensors, and active optical components. In accordance with an exemplary embodiment, a magnetically tunable photonic crystal system through the assembly of superparamagnetic iron oxide colloidal particles in aqueous solutions has been accomplished. It can be appreciated that one key to a successful assembly and a large tunability in photonic property is establishing long-range repulsive and attractive interactions that can cooperate to order the particles into periodic structures. In the case of superparamagnetic iron oxide particles in aqueous solution, external magnetic fields induce strong attractive forces between neighboring magnetic particles along the field, bringing them close to each other. Electrostatic repulsive forces are introduced to the particles by coating them with a layer of polyelectrolytes containing high density negative charges. The two forces reach a balance, eventually organizing the particles into long chains with equal interparticle separations. Diffraction occurs when the periodicity of the assembled structure and the wavelength of the incident light satisfy the Bragg condition. A variation in the strength of the magnetic field changes the strength of the attractive force, consequently the interparticle separation, and eventually the diffraction wavelength. The advantages of such a system include a wide tuning range covering the entire visible spectrum, a fast and fully reversible response, and the compatibility with miniaturization for device fabrication.

It can be appreciated that practical applications often require the use of nonaqueous solvents to achieve long-term stability and improved compatibility with device fabrication processes. Besides particle dispersibility, major challenge involved in building tunable photonic crystals is the establishment of sufficiently strong and long-range repulsive forces to balance the magnetic attractive force because the electrostatic forces are usually greatly diminished in nonaqueous solvents. It can be appreciated that the assembly process can also be extended to alkanolsolvents by making use of the long-range electrostatic force and the short-range solvation force, the latter of which is originated from the overlap of two relatively thick solvation layers on the hydrophilic silica covered particle surfaces. However, it can be appreciated that in order to establish long-range electrostatic repulsive interactions in nonpolar solvents, the energy barrier to forming surface charges is about 40 times larger than that in water. In addition, the solvation force between two hydrophobic surfaces in a nonpolar solvent is also negligible because of the extremely thin solvation layers.

In accordance with an exemplary embodiment, charge control agents are introduced into nonpolar solvents to reduce the energy barrier of charge separation, and thus creating long-range electrostatic repulsive interactions that can counteract the magnetic attraction to allow ordering of superparamagnetic colloids.

In accordance with an exemplary embodiment, the dispersibility of the iron oxide particles in nonpolar solvents can be improved through surface modification by taking advantage of well-developed silane chemistry. In a typical process, uniform superparamagnetic $Fe_3O_4$ colloidal particles with an average diameter around approximately 163 nm are first synthesized, and then coated with a thin layer of silica using a modified Stober process. The $Fe_3O_4@SiO_2$ particles are dried in air and then transferred to a solution of n-octadecyltrimethoxysilane (ODTMS) in 1,2-dichlorobenzene (DCB). The mixture is stirred at 120° C. for 3 hours to allow the hydrolysable alkoxy groups of the organosilanes to attack the surface silanols through an alcoholysis reaction. As a result, a monolayer of hydrophobic alkyl chains is grafted to the silica surface through the covalent —Si—O—Si-bonds, making the particles dispersible in most nonpolar solvents such as 1,2-dichlorobenzene, toluene, chloroform, and hexane.

Both the degree of grafting (disappearance of hydrophilic silanols) and the shielding ability of grafted hydrophobic chains contribute to the dispersibility of the modified $Fe_3O_4@SiO_2$ particles in nonpolar solvents. Typically, long reaction time (i.e., greater than 3 hours) and the use of small alkoxy groups, such as methoxy groups, which are reactive even without catalyst, favor a high degree of grafting. On the other hand, organosilanes with long alkyl chains are preferred because they can effectively shield the unreacted silanol groups. Among many organosilanes tested, ODTMS provides very effective dispersibility because it contains small alkoxy groups and a relatively long alkyl chain.

Figure 1:
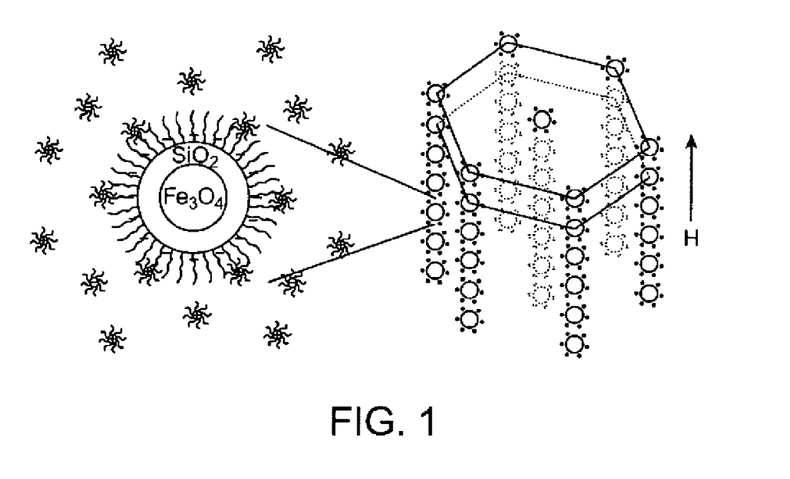
FIG. 1 shows schematic illustrations of the creation of negative charges on the surface of superparamagnetic colloids in nonpolar solvents by introducing a charge control agent sodium bis(2-ethylhexyl) sulfosuccinate (AOT) (left), and the assembly of such charged particles into tunable photonic structures upon application of an external magnetic field (right).

Direct assembly of surface-modified particles in nonpolar solvents, such as toluene and hexane, however, is difficult because of the lack of strong and long-range repulsive forces to balance the magnetic attractive force. It is known that the thermodynamics of charging in a liquid is controlled by the Bjerrum length, which is the characteristic separation between two ions at which their Coulombic interactions are exactly balanced by the thermal energy. Since nonpolar solvents usually have much lower dielectric constants and much higher Bjerrum lengths than those of polar solvents, charge separation is extremely difficult and energetically expensive, leading to a common expectation that electrostatic repulsion is negligible in nonpolar solvents. However, in accordance with an exemplary embodiment, the addition of charge control agents or surfactants to nonpolar dispersions can produce small reverse micelles of a few nanometers in diameter, which reduce the energy barrier of charge separation and enhance surface charges by stabilizing their counterions in the cores of micelles. Because of the practically low concentration of charge carriers in a nonpolar solvent, screening of electrostatic interactions is low and charge interactions are extremely long-ranged. As a result, strong electrostatic repulsions with screening length $\kappa^{-1}$ from 0.2 to 1.4 μm can be achieved by simply introducing charge control agents. In addition, a small fraction of micelles spontaneously ionizes as the result of thermal fluctuations, which contribute to the screening of particle interactions on longer length scales. Thus, upon the addition of reverse micelles, the charge behavior of a nonpolar dispersion comes to mimic that of an aqueous system in many ways (FIG. 1). For example, electrostatic interactions have the same functional form as those predicted from the classic theory of Derjaguin, Landau, Verwey and Overbeek (DLVO) for polar liquids, so that the charge behavior can be described in a way similar to the double layer model. Additionally, particle surface potentials are remarkably large, comparable to those of highly charged aqueous colloids. In accordance with an exemplary embodiment, the long-range electrostatic repulsions induced by the charge control agents can counterbalance the magnetic attraction to assemble superparamagnetic colloids in nonpolar solvents.

Figure 5:
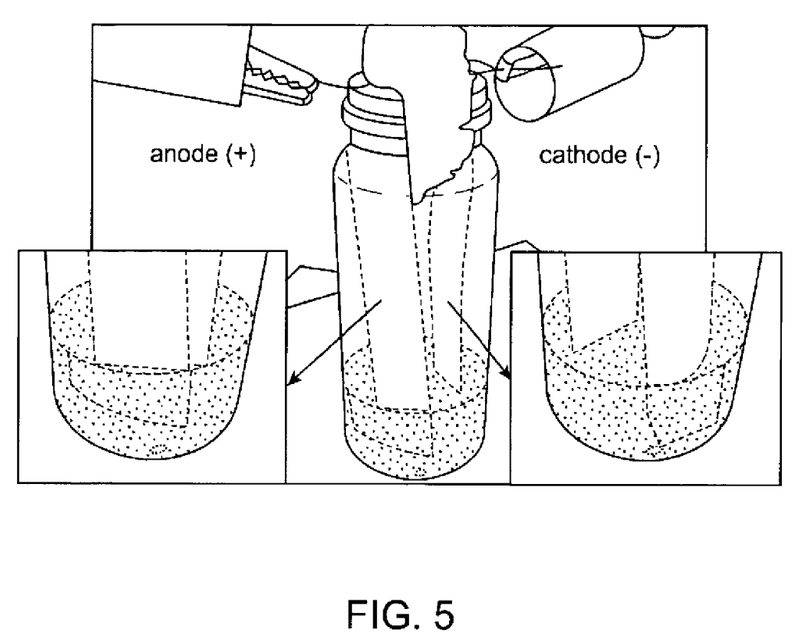
FIG. 5 shows electrophoresis of ODTMS modified $Fe_3O_4@SiO_2$ colloids in DCB by applying a voltage of 280V across a solution containing both particles and AOT, wherein the voltage was applied through two immersed stainless steel electrodes, and wherein after approximately 10 minutes, a brownish deposition of $Fe_3O_4@SiO_2$ particles appeared on the anode, while the cathode remained cleaned, suggesting that the silica surfaces are negatively charged.

In accordance with an exemplary embodiment, sodium bis(2-ethylhexyl) sulfosuccinate (AOT), a typical ionic surfactant, was chosen as the charge control agent. In accordance with an exemplary embodiment, it was found that ODTMS modified $Fe_3O_4@SiO_2$ colloids remain a good dispersion in most nonpolar solvents upon addition of AOT. To qualitatively characterize the induced surface charges, a simple electrophoresis experiment can be performed by applying a voltage (280 V) across a DCB solution containing both particles and AOT through two immersed stainless steel electrodes (FIG. 5). After approximately 10 minutes, a brownish deposition of $Fe_3O_4@SiO_2$ particles appeared on the anode, while the cathode remained clean. It can be appreciated that this experiment not only confirms the enhanced charge separation by addition of the charge control agent AOT but also demonstrates that the silica surfaces are also negatively charged.

Figure 2:
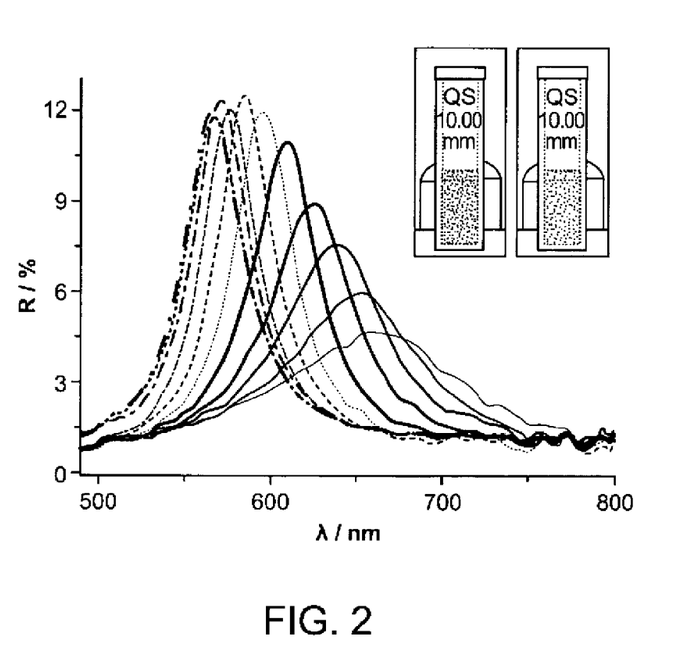
FIG. 2 shows reflection spectra of a n-octadecyltrimethoxysilane (ODTMS) in 1,2-dichlorobenzene (DCB) solution of 163-nm (115/24-nm) $Fe_3O_4@SiO_2$ particles in response to an external magnetic field with varying strengths achieved by changing the magnet-sample distance; and wherein diffraction peaks blue shift as the distance decreases from 4.3 to 2.3 cm with step size of 0.2 cm; and wherein the inset shows the digital photo of the DCB solution diffracting green and red lights under magnetic fields with two different strengths.
Figure 6:
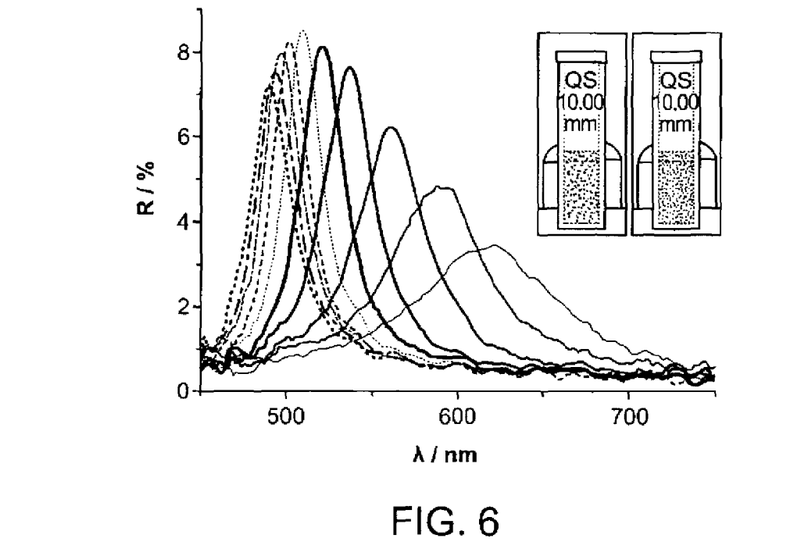
FIG. 6 shows reflection spectra of a DCB solution of 137-nm (96/20.5-nm) $Fe_3O_4@SiO_2$ particles in response to an external magnetic field with varying strengths achieved by changing the magnet-sample distance; diffraction peaks blue shift as the distance decreases from 3.5 to 1.7 cm with step size of 0.2 cm; and wherein the inset shows the digital photo of the DCB solution diffracting blue and green lights under magnetic fields with two different strengths.
Figure 7:
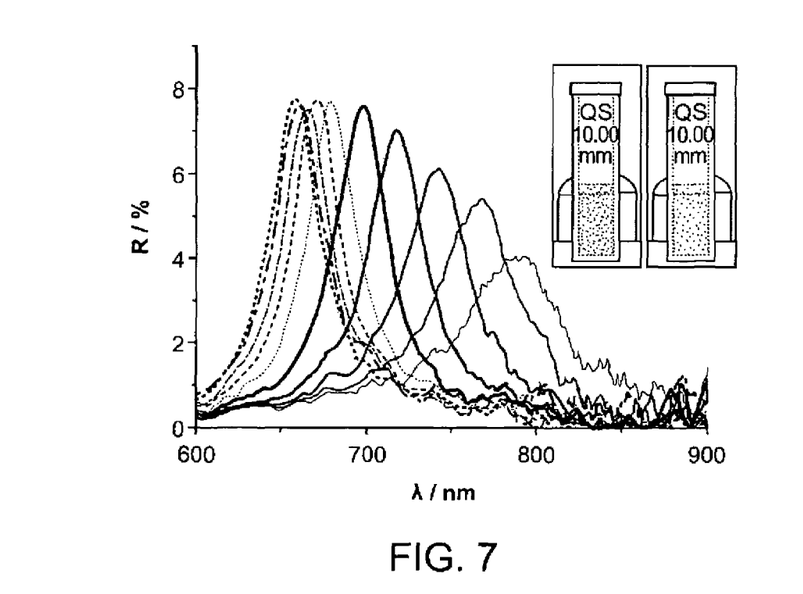
FIG. 7 shows reflection spectra of a DCB solution of 182-nm (116/33-nm) $Fe_3O_4@SiO_2$ particles in response to an external magnetic field with varying strengths achieved by changing the magnet-sample distance; diffraction peaks blue shift as the distance decreases from 3.5 to 1.7 cm with step size of 0.2 cm; and wherein the inset shows the digital photo of the DCB solution diffracting red and infrared lights under magnetic fields with two different strengths.

It can be appreciated that the successful establishment of long-range electrostatic repulsive interactions makes it possible to assemble the superparamagnetic colloids into tunable photonic crystals in nonpolar solvents by balancing the attractive force induced by external magnetic fields. Compared to the cases in aqueous and alkanol solutions, the current system retains the fast and fully reversible optical response to the external fields, long-term stability, and reasonably strong diffraction intensity. FIG. 2 shows the typical reflection spectra of $Fe_3O_4@SiO_2$ photonic crystals in DCB in response to a varying magnetic field, which is achieved by changing the distance between the magnet and the sample. The diffraction peak blue-shifts from 665 to 564 nm as the magnetic field increases from 191 to 622 Gauss. Similar to the aqueous case, the tuning of the diffraction is realized through automatic adjustment of interparticle distance, which is required to change the strength of electrostatic repulsion to reach a balance with the varying magnetic attractive force. The contour of the diffraction peaks shows a skewed profile as the magnetic field is tuned, which is similar to that in the alkanol case and implies the existence of structural repulsion in the short range in addition to the long-range electrostatic force. The typical tuning range of the photonic crystals in nonpolar solvents is within approximately 150 nm, which, unlike the aqueous system, can not cover the entire visible spectrum. If needed, $Fe_3O_4@SiO_2$ building blocks with different sizes can be assembled to display various colors, such as blue-green (FIG. 6), green-red (FIG. 2), and red-infrared (FIG. 7).

Figure 3A:
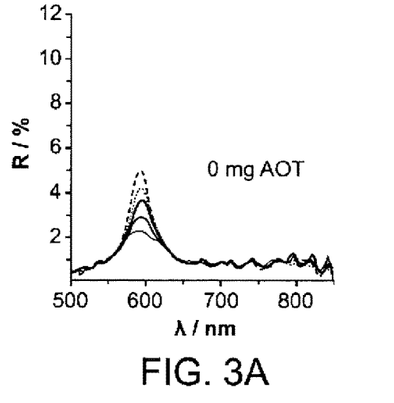
FIGS. 3a and 3b show reflection spectra of a 1.5 mL DCB solution containing 167-nm (103/32-nm) $Fe_3O_4@SiO_2$ particles and (a) 0 mg and (b) 1 mg AOT in response to an external magnetic field with varying strengths, respectively.
Figure 3B:
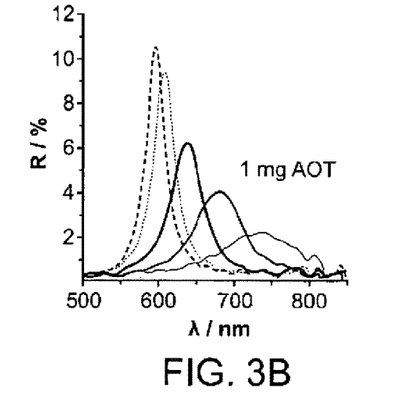

In accordance with an exemplary embodiment, the charge control agent AOT plays an important role in controlling the assembly behavior of superparamagnetic colloidal particles. In a DCB solution without AOT, as shown in FIG. 3a, the hydrophobic $Fe_3O_4@SiO_2$ colloids can self-assemble into ordered structures whose diffraction intensity increases slightly in an enhancing external magnetic field. However, the diffraction peaks remain at a fixed wavelength, suggesting a lack of strong long-range repulsive forces. The colloidal particles behave like hard spheres so that strong repulsion only appears when they are close to contact, making it impossible to tune the particle separation. When AOT is added in the same solution, considerable negative charges build up on the particle surface due to the enhanced charge separation. The particles interact with each other through the long-range electrostatic forces which dynamically balance the magnetic attraction and assemble them into chains with tunable particle separation. As shown in FIG. 3b, the diffraction peaks red-shift and can be tuned within a range of approximately 150 nm by varying the strength of external magnetic field.

The small AOT micelles serve two functions in determining the strength of electrostatic interactions. In accordance with one embodiment, the micelles provide a polar environment for the surface ions, which are originally hard to separate from the colloids in pure nonpolar solvents. Since micelles can exchange their inner contents through collision, the ions can be carried into the bulk solution, leaving behind a net charged colloid surface. In accordance with another embodiment, the AOT molecules can also dissociate to $Na^+$ and counterions, which are then separated by the micelle exchange, leading to the formation of charged micelles. Similar to the ions in aqueous colloidal systems, these charged micelles can screen the electrostatic interactions in nonpolar solvents (FIG. 1).

Figure 3C:
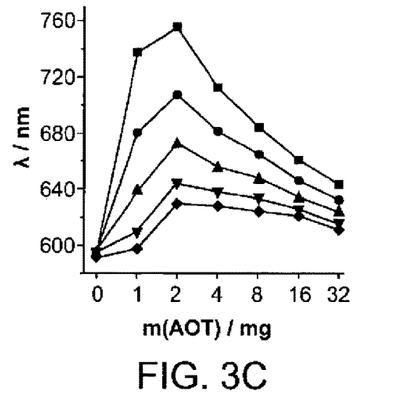
FIGS. 3c and 3d show dependence of (c) diffraction wavelength and (d) intensity upon the AOT concentration in magnetic fields with five different strengths.
Figure 3D:
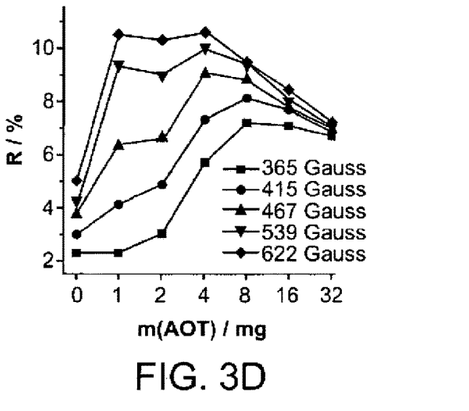
Figure 4:
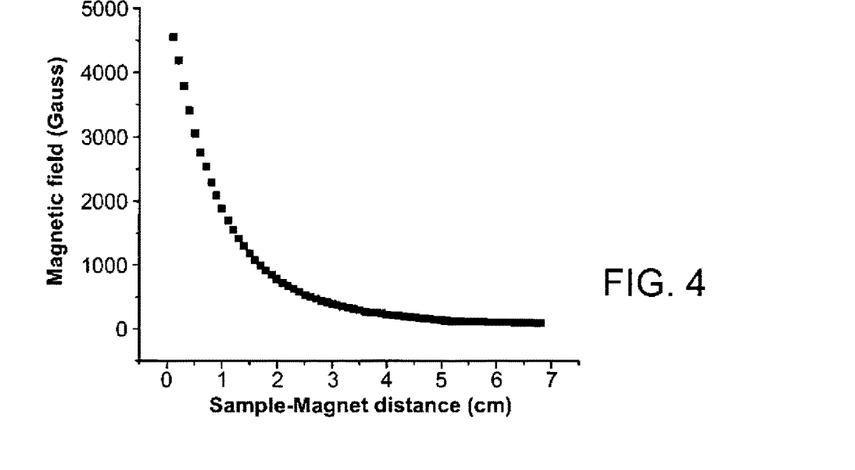
FIG. 4 shows dependence of the strength of the magnetic field on the sample-magnet distance for the NdFeB magnet used in accordance with one exemplary embodiment.
Figure 8:
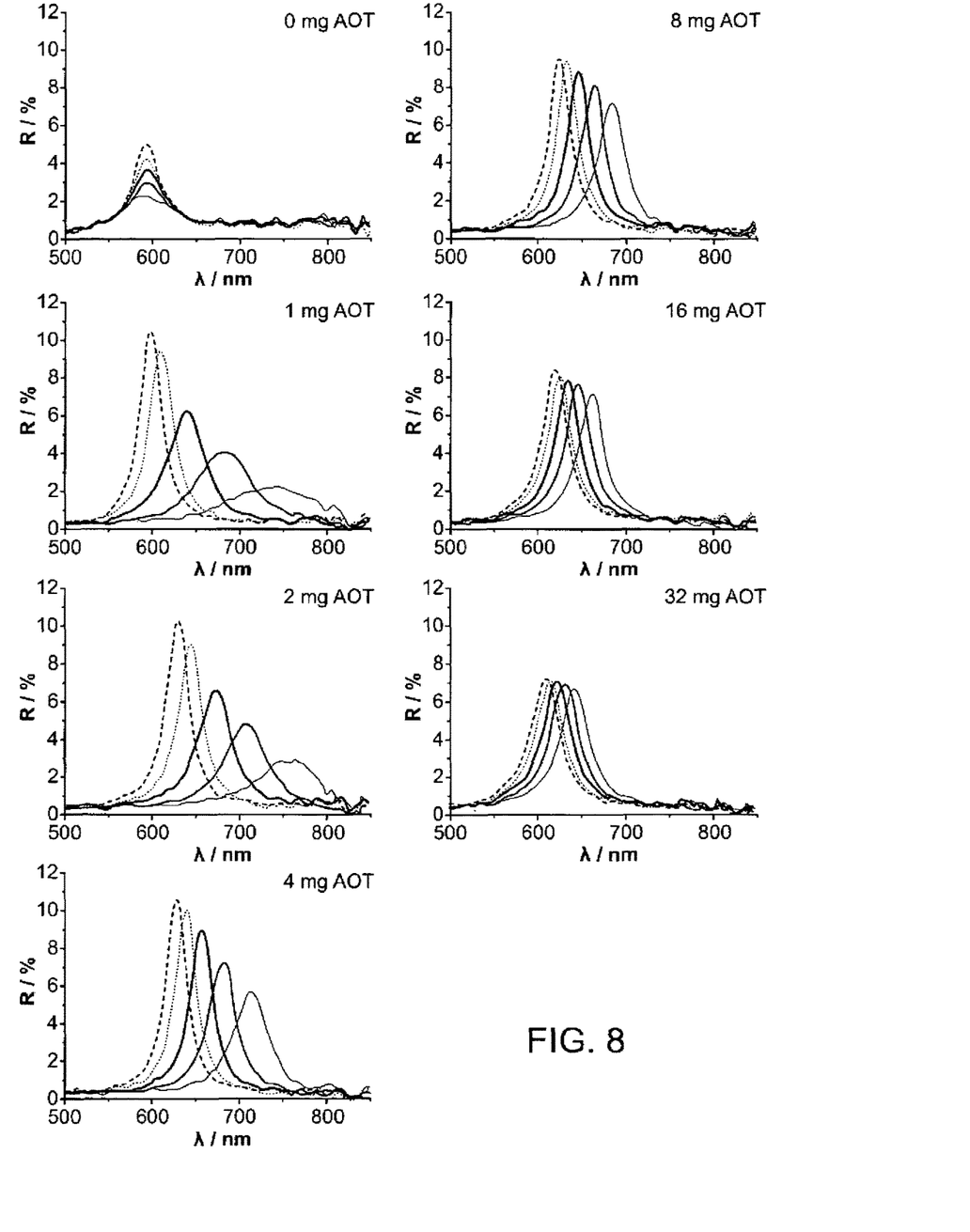
FIG. 8 shows reflection spectra of a 1.5 mL (milli-Liter) DCB solution containing 167-nm (103/32-nm) $Fe_3O_4@SiO_2$ particles and 0-32 mg AOT in response to an external magnetic field with varying strengths.
Figure 9:
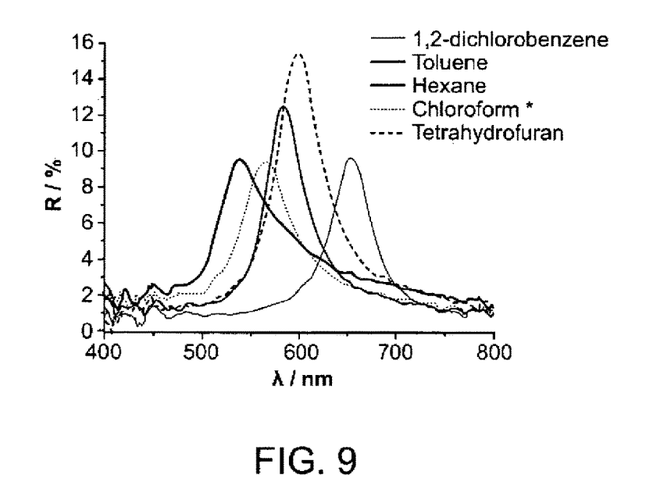
FIG. 9 shows reflection spectra of 143-nm (90/26.5-nm) $Fe_3O_4@SiO_2$ particles assembled in 1.5 mL organic solvents each containing 4 mg AOT; wherein diffractions of DCB, toluene and hexane, THF solution were measured in a 325 Gauss magnetic field, and diffraction of chloroform solution was measured in a 134 Gauss magnetic field.

The two functions can be clearly observed by studying the dependence of the diffraction wavelength on the concentration of AOT. In accordance with an exemplary embodiment, a series of diffraction spectra of systems containing different concentrations of AOT in response to external magnetic fields were recorded (FIG. 8). The data is re-plotted in FIG. 3C to highlight the dependence of the diffraction wavelength on the AOT concentration at fixed magnetic fields. One of the primary effects of AOT at low concentrations is to induce charge separation on the particle surface, as evidenced by the significant red shift of the diffraction peaks. When the red shift reaches maximum, further increase of the concentration of AOT creates free charged micelles which screen the electrostatic interactions between particles in a way analogous to the increase of ionic strength in aqueous solutions. As a result, the tuning range of the diffraction, as represented by the difference between the black and sky blue point at each concentration, shrinks upon further addition of AOT. Accordingly, as shown in FIG. 3d, the maximum diffraction intensity can be reached when the concentration of the AOT increases to the intermediate values. Additional AOT will decrease the diffraction intensity which is again consistent with the case of adding salt to aqueous solution. In accordance with an exemplary embodiment, it is worth noting that even with screening from the charged micelles, the overall diffraction intensity is still significantly higher than the case without AOT.

Thus, the establishment of long-range electrostatic repulsive forces in nonpolar solvents to allow the assembly of superparamagnetic colloids into ordered structures with magnetically tunable photonic properties has been obtained. The introduction of charge control agents such as AOT molecules produces micelles which can enhance the charge separation on the surfaces of ODTMS modified $Fe_3O_4@SiO_2$ particles. The significantly improved long-range electrostatic repulsion balances the magnetically induced attraction and therefore allows ordering of superparamagnetic colloids in nonpolar solvents. This system possesses fast and fully reversible optical response to the external magnetic field, long-term stability in performance, and good diffraction intensity. Besides the potential technological applications utilizing the field-responsive photonic properties, this system can also provide a convenient, quantitative optical method for studying fundamental topics such as the mechanism of charging in solvents of low permittivity.

Experimental Section

Chemicals

Ethanol (denatured), ammonium hydroxide aqueous solution (28%), toluene (99.8%), chloroform (99.8%), and hexane (99.9%) were purchased from Fisher Scientific. Tetraethylorthosilicate (TEOS, 98%), 1,2-dichlorobenzene (DCB, 99%) were obtained from Sigma-Aldrich. N-octadecyltrimethoxysilane (ODTMS, 99%) was purchased from Gelest. Dioctyl sulfosuccinate, sodium salt (AOT, 96%) was obtained from Acros Organics.

Synthesis of Hydrophobic $Fe_3O_4@$ $SiO_2$ Colloids $Fe_3O_4$ superparamagnetic cores were prepared by a high-temperature hydrolysis reaction reported previously. $Fe_3O_4@SiO_2$ core/shell colloids were prepared through a modified Stober process. Typically, an aqueous solution (3 mL) containing $Fe_3O_4$ CNCs (approximately 25 mg) was mixed with ethanol (20 mL), aqueous ammonia (28%, 1 mL) under vigorous magnetic stirring. TEOS (0.2 mL) was injected to the solution, and the mixture was allowed to react for 40 min. After washing with ethanol through centrifugation and redispersion for two times, the particles were dried in air and transferred to a mixture of 1,2-dichlorobenzene (DCB, 24 mL) and n-octadecyltrimethoxysilane (ODTMS, 0.5 mL), degassed for 30 min with $N_2$, and heated up to 120° C. for 3 hours to functionalize the silica surface with hydrophobic carbon chains. After cooling down to room temperature, the modified $Fe_3O_4@SiO_2$ colloids were washed with toluene and dispersed to different nonpolar solvents (typically 4 mL), such as DCB, chloroform, toluene and hexane.

Assembly of Magnetically Tunablephotonic Crystals in Nonpolar Solvent

Figure 10:
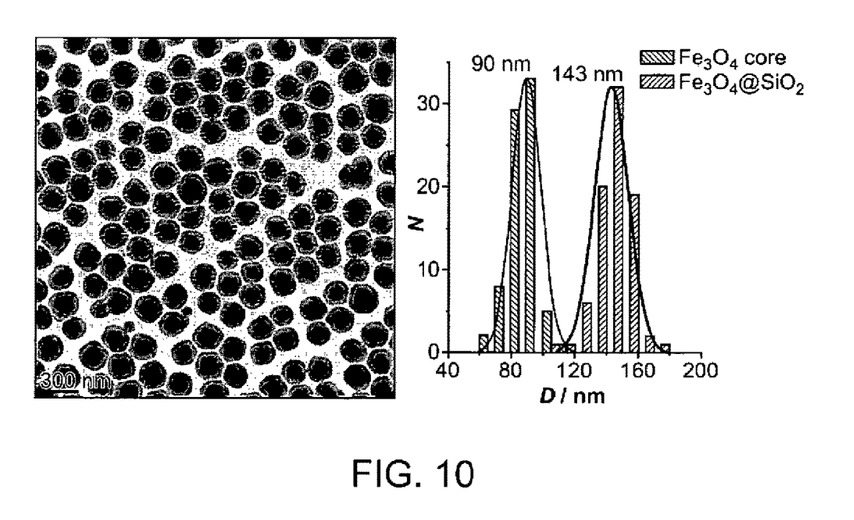
FIG. 10 shows typical TEM image of $Fe_3O_4@SiO_2$ colloids used for assembling the photonic crystals in different solvent shown in FIG. 9, and wherein the statistical results of size distribution indicate that the $Fe_3O_4$ core is 89.6±9.2 nm in diameter, and the $Fe_3O_4@SiO_2$ core/shell colloid has an average diameter of 143.1±10.7 nm.

In accordance with an exemplary embodiment, DCB was used as a typical example of nonpolar solvents. Stock solutions of DCB (0.5 mL) containing different concentrations of AOT were prepared in advance. The DCB solution (1 mL) of hydrophobic $Fe_3O_4@SiO_2$ colloids was mixed with the above AOT solutions, forming homogeneous and transparent dispersions. Assembly of $Fe_3O_4@SiO_2$ colloids into ordered structures with optical diffractions was performed by applying an external magnetic field to the solutions. Similar procedures were used for other nonpolar solvents such as toluene, chloroform, or hexane. Unlike the close-packed colloidal photonic crystals which generally require particle polydispersity below 2%, the typical size distribution of $Fe_3O_4@SiO_2$ colloids will vary from about 5% to 10% depending on the size of original $Fe_3O_4$ colloids. The silica coating process usually improves the monodispersity of the samples. As a benefit from the unique chain-like non-close-packed structure and high contrast of dielectric constant, these colloids can still form photonic crystals with strong diffraction intensity. From many statistical studies on size distribution like the one shown in FIG. 10 and their corresponding diffraction spectra, it is found that the diffraction peak become narrow and intensity increase as the particle monodispersity improves, which is consistent to the case of close-packed colloidal crystals.

Characterization

A Tecnai T12 transmission electron microscope (TEM) was used to characterize the morphology of the core/shell colloids. Samples dispersed in water at an appropriate concentration were cast onto a carbon-coated copper grid, followed by evaporation under vacuum at room temperature. The diffraction spectra of the photonic crystals were measured by an Ocean Optics HR2000CG-UV-NIR spectrometer coupled to a six-round-one reflection/backscattering probe. In a typical measurement, a thin glass vessel containing the nonpolar solution of $Fe_3O_4@SiO_2$ colloids was placed between the NdFeB magnet and reflection probe. The probe was perpendicular to the glass vessel and parallel to the direction of magnetic field. Reflection peaks were measured with the magnet fixed at a certain distance from the samples.

It will be understood that the foregoing description is of the preferred embodiments, and is, therefore, merely representative of the article and methods of manufacturing the same. It can be appreciated that many variations and modifications of the different embodiments in light of the above teachings will be readily apparent to those skilled in the art. Accordingly, the exemplary embodiments, as well as alternative embodiments, may be made without departing from the spirit and scope of the articles and methods as set forth in the attached claims.

What is claimed is:

1. A method of forming ordered structures, which diffract light to create color comprising:
    coating a plurality of $Fe_3O_4$ particles with $SiO_2$;
    grafting a monolayer of hydrophobic alkyl chains on the plurality of $SiO_2$ coated $Fe_3O_4$ particles by linking a fatty alcohol to the surface of the plurality of $SiO_2$ coated $Fe_3O_4$ particles;
    placing the plurality of SiO2 coated $Fe_3O_4$ particles with the monolayer of hydrophobic alkyl chains in a nonpolar solvent solution;
    adding a charge control agent to the nonpolar solvent solution in a concentration, which forms reverse micelles in the nonpolar solvent solution and enhances charge separation between the plurality of $SiO_2$ coated $Fe_3O_4$ particles with the monolayer of hydrophobic alkyl chains to form an ordered photonic structure with equal interparticle separation; and
    tuning the equal interparticle separation of a chain of $SiO_2$ coated $Fe_3O_4$ particles with the monolayer of hydrophobic alkyl chains based on the concentration of the charge control agent.

2. The method of claim 1, wherein the charge control agent is a surfactant.

3. The method of claim 2, wherein the surfactant is sodium bis(2-ethylhexyl) sulfosuccinate (AOT) having a concentration of AOT to nonpolar solvent of 0.67 mg/mL to 21.3 mg/mL.

4. The method of claim 1, further comprising:
    bonding an intermediate layer of an inorganic oxide and/or a polymer to the surface of the plurality of $SiO_2$ coated $Fe_3O_4$ particles; and
    attaching the coating of hydrophobic alkyl chains to the intermediate layer.

5. The method of claim 1, wherein the monolayer of hydrophobic alkyl chains on the plurality of $SiO_2$ coated $Fe_3O_4$ particles is stable in the nonpolar solvent solution.

6. The method of claim 1, further comprising:
    performing hydrolysis or a precipitation reaction to bind inorganic oxides to the plurality of $SiO_2$ coated $Fe_3O_4$ particles.

7. The method of claim 1, wherein the step of coating the plurality of $Fe_3O_4$ particles with the $SiO_2$ coating is performed by emulsion polymerization, dispersion polymerization, and/or living polymerization.

8. The method of claim 1, wherein the fatty alcohol is selected from the following:
    1-octadecanol, 1-dodecanol, 1-hexadecanol, 1-tetradecanol, 1-decanol, isostearyl alcohol.

9. A method of forming ordered structures, which diffract light to create color comprising:
    coating a plurality of $Fe_3O_4$ particles with $SiO_2$;
    grafting a monolayer of hydrophobic alkyl chains on the plurality of $SiO_2$ coated $Fe_3O_4$ particles by linking a fatty alcohol to the surface of the plurality of $SiO_2$ coated $Fe_3O_4$ particles;
    placing the plurality of SiO2 coated $Fe_3O_4$ particles with the monolayer of hydrophobic alkyl chains in a nonpolar solvent solution; and
    adding a surfactant to the nonpolar solvent solution in a concentration, which enhances charge separation between the plurality of $SiO_2$ coated $Fe_3O_4$ particles with the monolayer of hydrophobic alkyl chains to form an ordered photonic structure with equal interparticle separation, and wherein the surfactant is an amphiphilic organic compound that contains a hydrophobic group and a hydrophilic group and forms reverse micelles in the nonpolar solvent.

10. The method of claim 2, wherein the surfactant is an anionic compound containing sulfate, sulfonate or carboxylate anions.

11. The method of claim 10, wherein the sulfate, sulfonate or carboxylate anions are perfluorooctanoate, perfluorooctanesulfonate, sodium dodecyl sulfate, ammonium lauryl sulfate, and other alkyl sulfate salts, sodium laureth sulfate, alkyl benzene sulfonate, and/or fatty acid salts.

12. The method of claim 2, wherein the surfactants are cationic compounds with quaternary ammonium cations selected from the following:
    cetyl trimethylammonium bromide, hexadecyl trimethyl ammonium bromide, and other alkyltrimethylammonium salts, cetylpyridinium chloride, polyethoxylated tallow amine, benzalkonium chloride, and/or benzethonium chloride, and/or zwitterionic surfactants selected from the following: dodecyl betaine, cocamidopropyl betaine, and/or coco ampho glycinate.

13. The method of claim 2, wherein the surfactants include nonionic compounds selected from the following:
alkyl poly(ethylene oxide) alkylphenol, poly(ethylene oxide), copolymers of poly(ethylene oxide) and poly(propylene oxide), alkyl polyglucosides, fatty alcohols, and polysorbates.

14. A method of forming ordered structures, which diffract light to create color comprising:
synthesizing a plurality of magnetite crystals and coating the magnetite crystals with a layer of silica;
coating the plurality of magnetite crystals with the layer of silica with a hydrophobic coating such that the crystals are soluble in a nonpolar solvent solution;
adding a surfactant to the nonpolar solvent solution, wherein the surfactant enhances charge separation between the crystals to form an ordered structure with tunable particle separation; and
drying the magnetite crystals and then transferring the magnetite crystals to a solution of n-octadecyltrimethoxysilane (ODTMS) in 1,2-dichlorobenzene (DCB).

15. The method of claim 14, comprising
stirring the solution to allow the hydrolysable alkoxy groups of the organosilanes to attack the surface silanols through an alcoholysis reaction.

16. The method of claim 15, comprising:
dispersing the coated magnetite crystals in a nonpolar solvent solution, wherein the nonpolar solvent solution is 1,2-dichlorobenzene, toluene, chloroform, and/or hexane.

17. The method of claim 1,
wherein the fatty alcohols are linked to the $SiO_2$ surface of the $SiO_2$ coated $Fe_3O_4$ particles through an esterification reaction.

18. The method of claim 1, wherein the nonpolar solvent solution is 1,2-dichlorobenzene, toluene, chloroform, and/or hexane.

19. The method of claim 9, wherein the surfactant is sodium bis(2-ethylhexyl) sulfosuccinate (AOT) having a concentration of AOT to nonpolar solvent of 0.67 mg/mL to 21.3 mg/m L.

* * * * *